Aug. 14, 1934.  W. LINTERN ET AL  1,969,934
VEHICLE BODY VENTILATOR AND METHOD
Filed Dec. 3, 1931  2 Sheets-Sheet 1

INVENTORS
William Lintern
BY Alfred R. Lintern
Soule & Leonard
ATTORNEYS

Aug. 14, 1934. W. LINTERN ET AL 1,969,934
VEHICLE BODY VENTILATOR AND METHOD
Filed Dec. 3, 1931 2 Sheets-Sheet 2
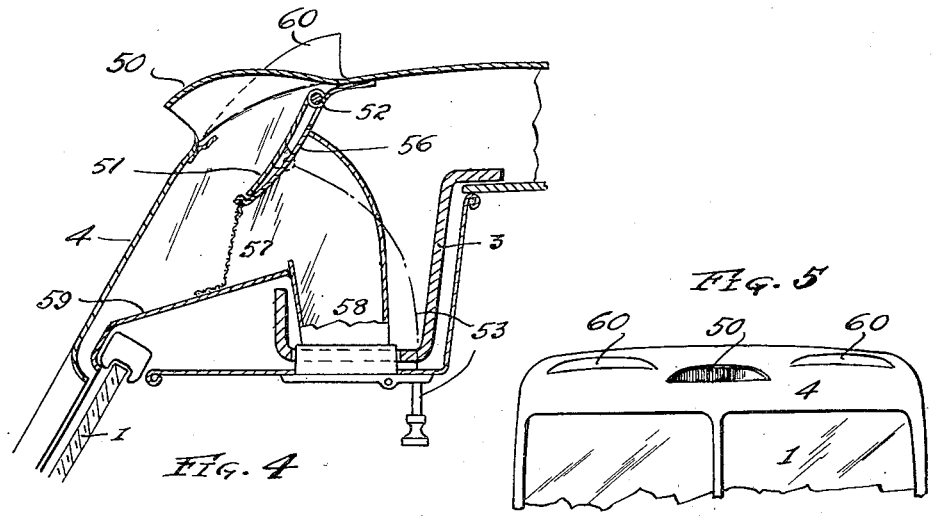
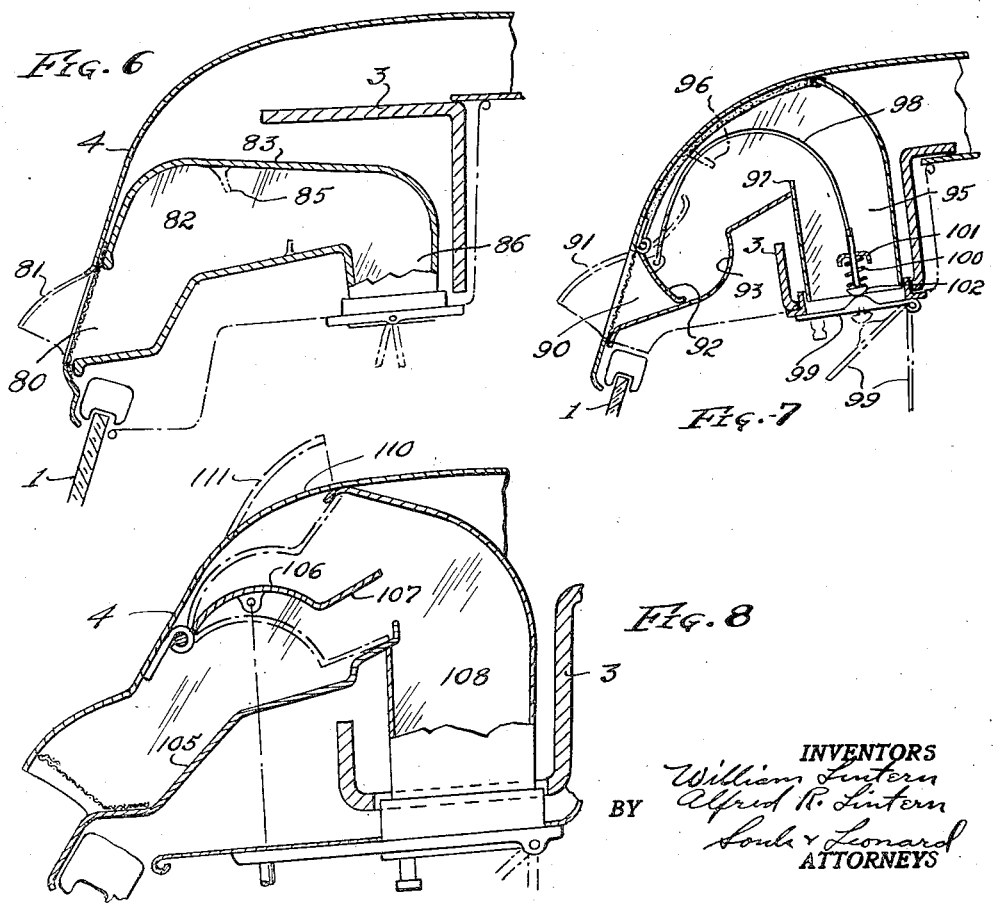
INVENTORS
William Lintern
Alfred R. Lintern
BY
Soule & Leonard
ATTORNEYS Patented Aug. 14, 1934

1,969,934

UNITED STATES PATENT OFFICE

1,969,934

VEHICLE BODY VENTILATOR AND METHOD

William Lintern and Alfred R. Lintern, Cleveland, Ohio

Application December 3, 1931, Serial No. 578,710

13 Claims. (Cl. 98—2)

Air injector devices of various types are known for aerating motor vehicle and like bodies by the employment of a suitable injector opening presented to the air stream which normally passes upwardly and rearwardly over the top of the body and roof structure.

These arrangements for taking air into the body we have found require radical rearrangements in providing an all weather device which will be compact, simple to operate and control, and which will afford the necessary volume of air in extremely hot weather for cooling otherwise uncomfortable portions of the body, for example, the space under the cowl, and, in general the driver's seat space.

The present application has to do with improvements in a simple and effective cooling and ventilating unit employing injected air from the normal air stream which passes over the body when the vehicle is in motion.

We have also found that unusually efficient ventilation of motor vehicle bodies may be effected by the provision of both air injection and air ejection arrangements in accordance herewith, using either separate or common channels for the injected and ejected air.

Similar arrangements are shown in the pending applications of William Lintern and Alfred R. Lintern, filed concurrently herewith as follows: Ser. No. 578,711 and Ser. No. 578,712, to which reference is directed.

The principal object of the present invention is to provide an improved all weather injector-ejector ventilator for automobile bodies and the like.

A specific object is to provide a simple and effective all weather injector ventilator for closed bodies of vehicles, particularly automobiles.

Still another object is to provide an improved air circulating method and apparatus for ventilating motor vehicles and like bodies.

Other objects and features of the invention will become apparent from the following description relating to the accompanying drawings, wherein we have shown our preferred forms. The essential characteristics are summarized in the claims.

Figure 1:
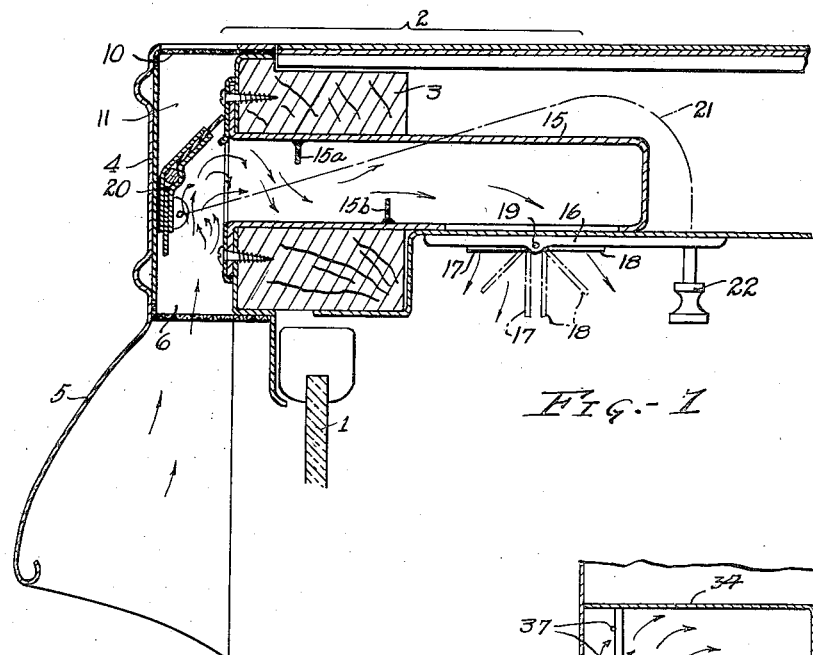
Figure 3:
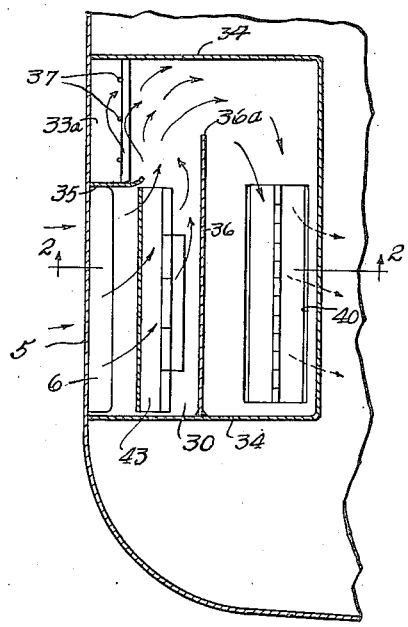
Figure 2:
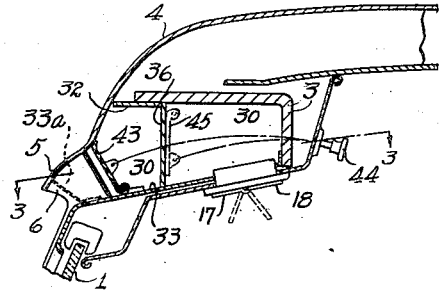
Figure 9:
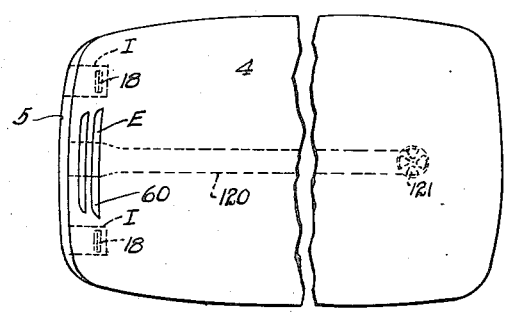

Referring briefly to the drawings, Fig. 1 shows a longitudinal cross section of a suitable ventilator arrangement adapted for car bodies and incorporating weather-proofing provision; Fig. 2 is a vertical sectional view taken substantially along the line 2—2 on Fig. 3; Fig. 3 is a fragmentary sectional plan view of one of a pair of injector ventilators substantially according to the arrangement shown in Fig. 2 and taken on the line 3—3 thereof; Fig. 4 is a longitudinal sectional view of still another form of combined intake and exhaust ventilator arrangements with separate ducts for independent operation or for simultaneous operation in circulating air in the body; Fig. 5 is a fragmentary front elevation corresponding to Fig. 4; Fig. 6 shows in longitudinal cross section, another arrangement of air injection ventilator; Figs. 7 and 8 are similar fragmentary sectional views of still different arrangements, and Fig. 9 is a plan view of a vehicle body roof showing an efficient arrangement of both injector and ejector ventilators for securing adequate air circulation in the body.

Referring first to Fig. 1, 1 indicates a portion of the windshield of a car body, such as a truck cab, and 2 the roof structure generally above the windshield and joining the same. 3 is a suitable header or cross brace for the roof structure. The header, as shown, is covered forwardly thereof by a suitable protective sheet metal member 4 which at its lower edge is formed into a combination air scoop and visor 5. We make use of the visor in scooping air from the air stream rising upwardly at the windshield. The cover 4, as shown, is in spaced relation to the header and there is provided at the bottom and top respectively, air injector and air ejector openings 6 and 10 guarded by suitable screens. The space indicated at 11 within the cover and forwardly of the header communicates with the interior of the body through an air duct 15, provided near its inner end with an outlet opening 16, covering which are adjustable shutter members 17 and 18, one directed forwardly from a suitable hinge 19 and the other rearwardly. Also within the space 11 is a control valve device 20 which is positionable by reason of a suitable control, such as a flexible wire or rod 21 and adjusting button 22, within the car body. In the position shown, the valve 20 operates to deflect the portion of the air stream, caught by the opening 6 into the duct and thence to the opening 16. The air stream within the passage 11 and duct 15 is further deflected or swirled by a suitable baffle 15a on the top wall of the duct 15 to precipitate moisture therefrom, there being a further baffle at 15b to trap such moisture and prevent flow thereof to the opening 16. Air received through the duct 15 may be directed in various ways by reason of the shutter-deflectors 17 and 18; for example, the air may be thrown directly forwardly against the windshield, keeping the same free from vapor by air circulation thereover, the air then passing downwardly into the cowl space, or the air may be directed straight downwardly by the deflector 17 with the deflector 18 closed, or the air may be divided and distributed by the two deflectors in an obvious manner with both open, part toward the front and part toward the rear of the car, or the entire air stream received through the duct 15 may be directed rearwardly in the body by reason of having only the deflector 18 open. Any suitable detent device, not shown, may be used to hold the deflectors 17 and 18 in their respective open and closed positions.

The device shown in Fig. 1 is also operable as an air ejector by swinging the valve 20 in a counterclockwise direction, as shown, obstructing passage of air into the duct 15 through the visor or lip device 5, the air being ejected by reason of the low pressure area above the screened opening 10 in such positioning of the valve. Features of the selective operation of the ventilator using a common air duct, such as 15, form the subject matter of a separate application of William and Alfred R. Lintern, Ser. No. 578,711 filed concurrently herewith.

Referring now to the arrangements shown in Figs. 2 and 3, these views show a different air injector arrangement which may be operated for securing adequate ventilation in all kinds of weather. There may be one or more of these on the body, one at each side for example.

In this form, the roof cover 4 is shown as flanged outwardly as at 5, forming an adequate air deflector which will scoop in part of the air stream passing upwardly from the windshield 1. Air enters at 6.

The air duct is best shown in Fig. 2 and is formed by substantially vertical partitioning forming a walled-in space at 30 within the roof structure.

As shown, the air entering the opening at 6 is directed laterally of the body while confined between upper and lower walls 32 and 33 (33 being inclined forwardly and downwardly as a water shed, and 32 including portions of the header member 3 as shown). There are, of course, end walls, see vertical members 34, completing the channel as in the other arrangement herein shown. Each opening 6 may be provided with an air directing and channel restricting rearwardly extending wall member 35, opposite which is a main partition wall or baffle 36, so arranged that the air is abruptly turned in a lateral direction as soon as it enters the space 30. Air received at 6 may pass around both ends of the wall or baffle 36, although the wall is shown as spaced (see free end 36a) from only one of the side walls 34; the air then going to the opening or openings 40 leading into the body.

Fig. 3 illustrates a principle of operation, in separating water and other foreign matter from the air, which we may employ to greater or less degree in all the preferred arrangements, either as shown or by adaptation where required. The velocity of the stream of air is increased (as by restricting the air channel—baffle 35 in cooperation with baffle or wall 36 and the top and bottom walls as shown) to increase the precipitation of foreign matter from the air consequent say upon a change in direction of movement thereof or other means causing the air of the stream to swirl.

The high velocity of the air stream occurs in those portions of the channel which are provided with means to drain the water (e. g.) out of the channel, but the space beyond the velocity increasing means is enlarged to then decelerate the air in its passage through the channel in order that moisture allowed or caused to precipitate on the walls will not be carried beyond the drainage affording surfaces. The air space, as shown, widens beyond the rearward edge of the baffle 35 and this space may be easily drained as through small openings 37 in an upwardly turned closure plate 33a secured to the floor member 33 and substantially abutting the cover flange 5 as a forward closure of the space 30 beyond the wall 35 from the opening 6.

A suitable means to admit and/or direct the air into the body may comprise swinging shutter-deflectors 17 and 18 positioned to control the outlet openings 40, the same as in Fig. 1.

To eliminate wind noise and close the front of the ventilator, we may provide a valve 43 operable as by means of a control wire or rod and button at 44. This valve may be variously positioned to increase or decrease the air velocity for the purposes above stated.

For fair weather ventilation, it may be desirable to have the baffle 36 (or a portion of it— see broken line indication at 45, Fig. 2) movable, so as to enable the air received at the opening 6 to flow directly to the outlet openings 40 with practically no impedance, for greater air volume.

Fig. 4 shows an arrangement in which the air intake from exteriorly of the body, is afforded by a projection 50 on top of the body which may be closed by a suitable valve device 51 swingable on a suitable hinge 52, the valve being controlled in its position by a suitable control wire and button assembly 53, such as previously described. The air channel or duct is afforded in part by a deflector plate 56 within the roof structure, which also defines part of a rearwardly extending portion of the duct (see opening 57). The lower portion of the duct, at 58, discharges into the interior of the body by suitable shutter or deflector arrangements, such as previously described in connection with Fig. 1.

Water drainage may be afforded in this form by reason of a bottom plate 59 leading forwardly over the windshield so as to discharge water on the windshield or at the sides as desired, the roof cover structure being shown as spaced slightly (for drainage only) from the plate 59 where it overlies the windshield frame; it being understood that no air is intended to be received by the slight passage afforded for drainage.

The air passage directing arrangement is such that air taken in by the lip 50 will be directed forwardly and against the interior surface of the roof cover 4 or a liner member thereof before it returns through the opening 57 to the inner duct tube 58, thereby insuring the precipitation of rain drops from the air to preclude entrance of moisture into the body. If desired, the position of the lip 50 might be moved forwardly and downwardly; likewise, the air receiving opening under the lip for better operation.

An essentially similar arrangement may be provided for exhausting air from the vehicle and this requires no illustration other than the louver 60 which may also have a valve, such as 51, governing the air passage through the opening beneath it into a separate duct arrangement, such as shown in Fig. 4. A suitable distribution of these devices across the front of the car is illustrated in Fig. 5. Here it will be seen that two air ejectors may be provided as by reason of the louvers shown at 60 and appropriate arrangements therebeneath, such as shown in Fig. 4, and one injector (see louver 50), or this may be reversed and the two louvers 60 may consist of air scoop lips, such as 50, in which case an ejector louver would be positioned as at 50 (see Fig. 5).

Fig. 6 shows an arrangement in which an air intake opening 80 is provided and if desired, a suitable lip or overhanging projection 81. The passage inwardly from the intake opening is directed abruptly upwardly into an enlarged space 82 afforded by the tube structure generally shown at 83. Beyond the space 82 is a downwardly and rearwardly directed deflector 85 (optional) designed to favor a clockwise swirling of the air received from the upwardly extending channel, which air after having the moisture precipitated therefrom onto the inclined lower wall of the duct 83 passes to the body discharge opening 86 of the duct. This opening 86 may, of course, be governed by suitable deflector arrangements, such as previously herein shown and described.

Another arrangement is shown in Fig. 7 in which the intake opening 90 (provided, as shown, with a suitable overhanging lip 91) is adapted to be closed by an adjustable curved valve 92, arranged to cooperate with the interior of the air duct, see particularly the curved surface 93 to rapidly swirl the air caught from the air stream before allowing passage of the same to the inner portion of the duct; see vertical tube effect at 95. The arrangement may also include a downwardly directed deflector 96 and upwardly directed deflector or dam 97 to further preclude the passage of moisture with the air.

A further feature of this arrangement is that the valve device 92 is connected as by a suitable control rod or wire 98 with the hinged shutter-deflector member 99, the arrangement being such that the valve 92 is normally given a tendency to open by a suitable spring 100, acting against a suitable support 101 at one end and against an enlarged head 102 on the inner end of the control rod or wire. When the shutter-deflector 99 is moved to the first open position, indicated in broken lines, the valve 92 is fully opened, this position being for directing the air received through the duct forwardly and against the windshield and then downwardly into the body. The further opening of the shutter-deflector 99 to the lowermost broken line position simply withdraws the shutter-deflector 99 from contact with the head 102, but without changing the position of the valve 92. Thus, whenever the shutter-deflector is positioned for operation to direct air into the body, the valve for admitting air into the duct generally is opened automatically and is closed whenever the shutter-deflector is closed, thus eliminating wind noise and reducing the chances of water or snow being driven into the ventilator when the car is standing still and the shutter-deflector closed.

Fig. 8 differs from the above described arrangements, principally in that the adjustable valve is curved to better afford protection against rain in operating the vehicle at high speeds in wet weather. The arangement includes a duct with an upwardly extending projection 105 near its forward portion and a valve member 106 positioned thereabove, the projection 105 forcing the incoming stream of air upwardly against the curved surface of the valve member, whereby the air is swirled rapidly before it escapes under the overhanging lip 107 into the vertical portion 108 of the duct leading to the interior of the body.

Three positions of the valve member are illustrated; one position in which all entrance of air to the vertical duct portion 108 is precluded; another in which the entrance of air is greatly restricted but the moisture precipitation feature increased, and a third position in which a very wide and free passage of air is afforded through the entire duct for greater ventilation (more air) in fair weather.

If desired, this arrangement may also incorporate an air ejector feature simply by the provision of top openings in the position indicated at 110, for example, and further if desired, by the provision of louvers at 111 overhanging the opening or openings 110. Raising the valve member 106 to its uppermost position, cuts off air communication between the body and opening or openings 110 and the lowermost position of the valve cuts off communication between the intake opening in the body.

Referring now to Fig. 9, this figure shows an arrangement of any of the air injector or ejector devices disclosed herein, or the two applications of William and Alfred R. Lintern, Ser. No. 578,711 and Ser. No. 578,712 filed concurrently herewith.

In Fig. 9, 4 is a top covering member or members of an automobile body top shown as provided with a forwardly projecting lip 5, say on the order of the arrangement shown in Figs. 6 and 7 hereof. 18 represents the position of the shutter-deflectors of such an arrangement by which the injector ventilator device I may be rendered effective to throw the air received in the injector forwardly, downwardly or rearwardly, as desired.

An ejector ventilator E may be for convenience, positioned between two injectors I and may be provided with air discharge openings with louvers at 60. A suitable air shaft 120 leads from the exhaust end of the ejector E to a suitable regulator or grille in the rear of the body. Any suitable means, such for example, as the control arrangement shown herein, may be provided to operate the ejectors and the injectors separately or concurrently as desired. In case of concurrent operation, it will be seen that large quantities of air may be admitted by the injector and thrown downwardly toward the bottom of the body or in any direction desired, which injected air, after aerating, cooling and ventilating the body, is withdrawn at the device 121 for ejection into the open air at 60.

The surprising efficiency of an arrangement according to Fig. 9, for example, and using any of the injector and ejector devices disclosed herein, or in the companion cases, is that the large volume of air under high pressure which banks against the windshield or front wall is used to effect air injection and air ejection. The air injection is effected by diverting a portion of the high pressure air stream into the body through the injector opening or openings. The remainder of the same air stream continues beyond the front wall and is discharged thereby into the relatively rearwardly moving air stream occasioned by forward movement of the body, thereby creating an extremely effective low pressure area behind the effective marginal limit of the front wall. This is notwithstanding the stream line type of body shown and notwithstanding the provision of air scoop devices and air ejector openings in the same vertical plane longitudinally of the body, since the volume of air deflected from the windshield is so great at normal driving speeds that the scoop devices are insufficient to divert the air stream from its course. It continues to flow with increasing velocity and creates the low air pressure area, as above set forth.

Referring, for example, to Fig. 1 or 2, it will be seen that the injected air irrespective of how it is directed, as by the shutter-deflectors at the inner end of the ducts or air channels, will distribute a large portion of the air received at the intake opening or openings at breathing height, whereas with current types of ventilators, particularly windshield and cowl ventilators, the air is received into the car body so close to the floor that before backflow thereof reaches the driver or front seat passenger, it is laden with dust from the floor. Moreover, air received in such manner that it must pass through the cowl space first, is necessarily heated, wherefore no great amount of comfort is obtained by such methods of ventilation.

In the present case, it will be seen that the injected air is in the first place, cool and clean because of the position of the injector openings well above the hood, yet forwardly of the body. Adequate quantities of such clean cool air are delivered at breathing height, both to the front seat and rear seat passengers, and because of the large volume, there is still enough for projection down into the cowl space to keep this space cool. An enormous advantage over previously known and used types of ventilators is gained by the fact that in using both injection and ejection methods, as herein described, the injected air can be divided between different spaces in the body, the deflector-shutter arrangement being simply exemplary of a suitable arrangement for this; see particularly the double deflector-shutter arrangement (Fig. 1, for example). By the use of the ejector or ejectors simultaneously with operation of the injector, the air received and distributed in the body, as above stated, is withdrawn from any desired point or points in the body and very effectively removed. It has been observed that removing air through ejector devices opening to the outside air rearwardly of the body has the disadvantage, namely, that when the vehicle is slowed down or stopped, air rushes into the ejector opening or openings, very often carrying with it large quantities of dust. With the ejector openings located in accordance with the present method and apparatus, there is no backrush of air into the car through the ejector or ejectors. In our experiments, we have never observed dust or rain blowing into the car through either the injector or ejector apparatus disclosed in this and the above identified concurrently filed applications.

It will be understood that all the arrangements herein shown may be modified to the extent of taking the injected air to any desired point in the body or to any other parts of the vehicle it is desired to cool, ventilate or aerate. Likewise, the ejectors may, by the use of suitable conduits, operate to withdraw air from any desired portion of the vehicle.

We claim:

1. A vehicle body and ventilator, said body including a roof structure and a front wall joined thereto, said front wall including a forwardly facing transparent windshield, an injector opening in said front wall above the windshield, walls comprising a tube arranged to convey air received at said opening into the body, said tube being substantially open only at its outer and inner ends, the outer end being in registration with said injector opening and the inner end being directed downwardly toward the floor of the body to discharge air downwardly behind the windshield toward the floor, deflecting means within said tube and forwardly from the downwardly directed portion thereof and arranged to forcibly direct air transversely of the tube against a wall thereof opposite the deflecting means for precipitating moisture from such air onto said opposite wall, and means in the tube intermediate said deflecting means and the downwardly directed portion of the tube for obstructing passage of such moisture into the downwardly directed portion of the tube.

2. A vehicle body and ventilator, said body including a roof structure and a front wall joined thereto, said front wall including a forwardly facing transparent windshield, an injector opening in said front wall above the windshield, a tube in registration with the opening for conveying air received at said opening into the body, said tube having contiguous upwardly, rearwardly and downwardly directed portions, the upwardly directed portion being adjacent the opening for receiving air therefrom and the downwardly directed portion comprising the outlet of the tube for directing air toward the floor of the body, and deflecting means arranged on one wall of the tube within one of said first two mentioned portions thereof for directing air in said portion onto the opposite wall of the same portion, whereby suspended particles of moisture in the air will be precipitated therefrom onto said opposite wall, and means in the tube beyond said deflecting means in the direction of air passage through the tube to obstruct passage of such moisture into the downwardly directed portion of the tube.

3. An automobile body and ventilator, said body including a roof structure and a front wall joined thereto, said front wall including a forwardly facing transparent windshield, an injector opening in said front wall above the windshield, walls forming a tube in registration with the opening and arranged to convey air received at said opening into the body, the outer end of the tube being in registration with said injector opening and the inner end being directed into the body, deflecting means carried by one wall of the tube within the same and inclined opposite to the general direction of passage of air therethrough, the tube wall opposite the deflecting means being inclined downwardly and arranged to drain moisture, precipitated from the air by said deflecting means, from the tube.

4. In an automobile body, said body comprising a front wall including a transparent windshield, roof structure and side walls joined to the front wall, an injector opening through the front wall above the windshield and arranged to divert a portion of the normal air stream passing upwardly from the windshield and over the top wall, and a tube for leading such diverted air into the interior of the body, said tube extending rearwardly from the opening into the roof structure to direct the diverted air into the body, adjustable means within said tube and control means therefor operable from within the body and arranged to control the adjustable means to completely close the tube in one position and in another position to direct the air received by the opening transversely of the tube to precipitate moisture therefrom before such air is received into the body space, and means in the tube beyond the adjustable means in the direction of air flow therethrough and co-operating with the adjustable means to obstruct passage of such moisture into the body space.

5. An automobile body and ventilator, said body including a roof structure and a front wall joined thereto, said front wall including a forwardly facing transparent windshield, an injector opening in said front wall above the windshield, a tube within the body in registration with the opening and arranged to convey air received at the opening into the body, a closure member for the tube within the same and pivoted to one wall thereof, and means within the body arranged to control the position of the closure member to move the same into various positions, one of said positions being such as to abruptly deflect air received in said tube against an opposite wall of the tube to precipitate moisture from such air, and means in said tube beyond said closure member in the direction of air passage in the tube to obstruct passage of such precipitated moisture into the car body.

6. A vehicle body and ventilator, said body including a roof structure and a front wall joined thereto, said front wall including a forwardly facing transparent windshield, an injector opening in said front wall above the windshield, a tube registering with said opening at one end, the other end of the tube being arranged to discharge air into the body, a baffle plate positioned transversely in said tube for directing air transversely of the tube and precipitating moisture therefrom during passage of air through the tube, a portion of the baffle plate being movably and adjustably arranged whereby in one adjustment thereof air passes directly through the tube for fair weather operation.

7. In an automobile body of the closed type, a front wall and a roof contiguous therewith, there being a common outer wall cover member extending upwardly in superposed relation to the upper portion of the front wall and then rearwardly in superposed relation to the roof, means cooperating with the upwardly extending portion of said member to form an air injector inlet passage, an air ejector outlet passage in the upwardly facing portion of said member, and means for communicating said passages with the interior of the body for aerating and ventilating the interior of said body.

8. In an automobile body of the closed type, said body comprising a front wall including substantially the usual transparent windshield and framework therefor forming the front wall of the body, side and top body walls joined to said front wall and extending rearwardly therefrom, a header member extending transversely of the body and forming the main connecting brace between the front wall structure and top wall, means cooperating with said header member and forming an air duct in said structure, the header member forming one wall of said duct, means disposed above the windshield and forming an air injector inlet passage for intercepting air deflected upwardly from the outer windshield surface and directing such intercepted air into said duct, and means communicating the duct with the interior of the body.

9. In an automobile body of the closed type, a front wall structure including a transparent windshield and a frame therefor, a top wall structure, a relatively heavy metal header member extending transversely of the body and forming the main connecting brace between the front wall structure and top wall structure, an outer wall cover member extending upwardly substantially from the windshield and then rearwardly to the top wall structure, said member being in spaced relation to the header member, means cooperating with the outer cover member to form an air injector inlet passage for intercepting air flowing over the windshield, means including inner surfaces of both said outer cover member and said header member and forming an air injector duct communicating with said passage, said duct being arranged to discharge air received through said passage into the interior of the body.

10. In an automobile body, comprising a front wall including a transparent windshield and a roof extending rearwardly from the front wall, a hollow header structure intermediate the adjacent ends of the roof and front wall and rigidly secured to said roof and forming a part of the body frame, separate discommunicated ducts interiorly of the header structure, means forming an air inlet passage disposed at the forward portion of the header structure and communicating with the outside air forwardly of the body and interiorly of the header with one of said ducts, an air outlet passage in said header structure disposed above the inlet passage and communicating with the other of said ducts, and passages respectively communicating said ducts with the interior of the vehicle body.

11. A vehicle body and ventilator, said body including a front wall including a transparent windshield and a top wall, air injector means intermediate of said walls for diverting a portion of the air stream which flows upwardly over the windshield into the body when the vehicle is in motion forwardly, said means including an injector duct having a single discharge vent located closely adjacent and behind the upper portion of the front wall, and air directing means associated with the discharge vent for directing part of the injected air downwardly from said discharge vent along the windshield interiorly of the body and part of said air rearwardly from said discharge vent into the interior of the body.

12. A vehicle body and ventilator, said body including a front wall and a top wall, air injector means intermediate of said walls for diverting a portion of the air stream which flows upwardly over the front wall when the vehicle is in motion forwardly into the body, said means including an injector duct having a discharge passage located closely adjacent and behind the upper portion of the front wall, and individually positionable deflector members at the said discharge passage of the duct for dividing the injected air for distribution in different directions in the body at the same time.

13. In an automobile body of the closed type, said body comprising a front wall including a transparent windshield and top and side walls joined to the front wall and extending rearwardly therefrom, a transverse metal header member supporting the forward portion of the top wall and connected to another of said walls to secure the top wall thereto, an air injector inlet passage opening at an upper portion of the front wall, an air ejector outlet passage opening at the top wall at the forward portion thereof, and ducts respective to said passages communicating therewith and located between the header member and the adjoining portions of said front and top walls for respectively communicating the interior of the body with said passages.

WILLIAM LINTERN.
ALFRED R. LINTERN.